US008364658B2

(12) United States Patent
Kraft

(10) Patent No.: US 8,364,658 B2
(45) Date of Patent: Jan. 29, 2013

(54) USER ENTERTAINMENT AND ENGAGEMENT ENHANCEMENTS TO SEARCH SYSTEM

(75) Inventor: Reiner Kraft, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 484 days.

(21) Appl. No.: 12/272,545

(22) Filed: Nov. 17, 2008

(65) Prior Publication Data

US 2009/0077072 A1    Mar. 19, 2009

Related U.S. Application Data

(63) Continuation of application No. 11/183,114, filed on Jul. 14, 2005.

(51) Int. Cl.
*G06F 17/30* (2006.01)

(52) U.S. Cl. .................. 707/706; 707/769; 715/709

(58) Field of Classification Search .................. 707/705, 707/706, 769, 770; 715/709
See application file for complete search history.

(56) References Cited

U.S. PATENT DOCUMENTS

| | | | | |
|---|---|---|---|---|
| 4,823,283 | A * | 4/1989 | Diehm et al. | 715/825 |
| 5,179,654 | A * | 1/1993 | Richards et al. | 715/708 |
| 5,619,709 | A | 4/1997 | Caid et al. | |
| 5,734,887 | A | 3/1998 | Kingberg et al. | |
| 6,285,987 | B1 | 9/2001 | Roth et al. | |
| 6,574,622 | B1 * | 6/2003 | Miyauchi et al. | 1/1 |
| 6,947,930 | B2 | 9/2005 | Anick et al. | |
| 6,964,608 | B1 | 11/2005 | Koza | |
| 7,010,568 | B1 * | 3/2006 | Schneider et al. | 709/203 |
| 7,028,024 | B1 | 4/2006 | Kommers et al. | |
| 7,036,145 | B1 | 4/2006 | Murphy et al. | |
| 7,257,794 | B2 | 8/2007 | Tang et al. | |
| 7,343,371 | B2 * | 3/2008 | Ibuki et al. | 1/1 |
| 7,765,481 | B2 * | 7/2010 | Dixon et al. | 715/738 |
| 7,941,428 | B2 | 5/2011 | Huston | |
| 7,979,457 | B1 | 7/2011 | Garman | |
| 8,032,483 | B1 * | 10/2011 | Haveliwala et al. | 707/602 |
| 2001/0034016 | A1 | 10/2001 | Ziv-el et al. | |
| 2001/0034635 | A1 | 10/2001 | Winters | |
| 2002/0040317 | A1 | 4/2002 | Neumeyer et al. | |
| 2002/0105532 | A1 | 8/2002 | Oblinger | |
| 2002/0128056 | A1 | 9/2002 | Kato | |
| 2003/0028441 | A1 * | 2/2003 | Barsness et al. | 705/26 |
| 2003/0041091 | A1 | 2/2003 | Cheline et al. | |
| 2003/0088554 | A1 | 5/2003 | Ryan et al. | |
| 2003/0135582 | A1 | 7/2003 | Allen et al. | |
| 2004/0148224 | A1 | 7/2004 | Gauthier et al. | |
| 2005/0060283 | A1 * | 3/2005 | Petras et al. | 707/1 |
| 2005/0149395 | A1 * | 7/2005 | Henkin et al. | 705/14 |

(Continued)

OTHER PUBLICATIONS

Faabor et al., A Goal-Oriented Web Browser, MIT Media Lab, Dated Apr. 2006, 10 pages.

(Continued)

*Primary Examiner* — John E Breene
*Assistant Examiner* — Andalib Lodhi
(74) *Attorney, Agent, or Firm* — Hickman Palermo Truong Becker Bingham Wong LLP

(57) ABSTRACT

According to one aspect of the present invention, a method of actively engaging a user of a search system can include receiving from the user a search query for a search of a corpus of information and providing the user with search results for the search. The user can also be prompted to participate in a search-related activity wherein at least one aspect of the search-related activity is dependent on a context of the search. User input for performing the search-related activity can be accepted and an activity response can be provided to the user.

12 Claims, 12 Drawing Sheets

U.S. PATENT DOCUMENTS

2006/0020533 A1* 1/2006 Lee .................................. 705/35
2006/0224938 A1 10/2006 Fikes et al.
2006/0277108 A1* 12/2006 Altberg et al. .................. 705/14
2010/0293057 A1* 11/2010 Haveliwala et al. ....... 705/14.66

OTHER PUBLICATIONS

Miller, Micahel, "The Ultimate Google Resource", Googlepedia: Second Edition, Dated Sep. 10, 2007, 5 pages.

* cited by examiner

USER ENTERTAINMENT AND ENGAGEMENT ENHANCEMENTS TO SEARCH SYSTEM

CROSS REFERENCE TO RELATED CASES

This application is a continuation of U.S. patent application Ser. No. 11/183,114 filed Jul. 14, 2005 which is incorporated herein by reference as if fully set forth herein, under 35 U.S.C. §120.

BACKGROUND OF THE INVENTION

The present invention relates in general to searching a corpus of documents, and in particular to search systems and methods utilizing one or more search-related activities to active engage a user of a search system.

The World Wide Web (Web) provides a large collection of interlinked information sources in various formats including texts, images, and media content and relating to virtually every subject imaginable. As the Web has grown, the ability of users to search this collection and identify content relevant to a particular subject has become increasingly important, and a number of search service providers now exist to meet this need. In general, a search service provider publishes a Web page via which a user can submit a query indicating what the user is interested in. In response to the query, the search service provider generates and transmits to the user a list of links to Web pages or sites considered relevant to that query, typically in the form of a "search results" page.

Query response generally involves the following steps. First, a pre-created index or database of Web pages or sites is searched using one or more search terms extracted from the query to generate a list of hits (usually target pages or sites, or references to target pages or sites, that contain the search terms or are otherwise identified as being relevant to the query). Next, the hits are ranked according to predefined criteria, and the best results (according to these criteria) are given the most prominent placement, e.g., at the top of the list. The ranked list of hits is transmitted to the user, usually in the form of a "results" page (or a set of interconnected pages) containing a list of links to the hit pages or sites. Other features, such as sponsored links or advertisements, may also be included on the results page.

The web pages provided by the search service providers via which a user can submit a query vary somewhat in layout, content, look-and-feel, etc. but generally include a text box for input of keywords for use in the query. Results of the search are provided in a results page with a list of links to results (i.e., pages found to have content matching the query) and possibly one or more advertisements. This format results in a search process that is very structured and not particularly entertaining. So, once a user locates information relevant to his interest, the user typically leaves the search service provider's web page quickly. Further, there is little or no incentive for the user to go back to the search service provider's web page after the information desired has been located.

Thus, it would be desirable to provide a more entertaining or interesting interface to actively engage a user of the search system to encourage the user to spend more time at the search service provider's web page.

BRIEF SUMMARY OF THE INVENTION

Embodiments of the present invention provide search systems and methods using one or more search-related activities to actively engage a user of a search system. One or more aspects of the search-related activity can be related to the context of the search. With activities that are in some way related to the search being performed by the user, the activities can be more relevant and more appealing to the user.

According to one aspect of the present invention, a method of actively engaging a user of a search system can include receiving from the user a search query for a search of a corpus of information and providing the user with search results for the search. The user can also be prompted to participate in a search-related activity wherein at least one aspect of the search-related activity is dependent on a context of the search. User input for performing the search-related activity can be accepted and an activity response can be provided to the user.

The context of the search can include, but is not limited to one or more of the search query, a user identifier of a searcher, contents of the search results, a search history for the user, advertisements used without search context elements, and a time of day of the search. Search related activities can include, but are not limited to an instant win game, a riddle game, a search query competition, a link location game, a guessing game, a link collection competition, a chain type riddle game, and/or an elimination type puzzle competition.

DETAILED DESCRIPTION OF THE INVENTION

Methods and systems are described herein for making a user's interaction with a search service provider's web page more entertaining and engaging. As will be described, embodiments of the present invention provide for using one or more search-related activities to actively engage a user of a search system. One or more aspects of the search-related activity can be related to the context of the search. With activities that are in some way related to the search being performed by the user, the activities can be more relevant and more appealing to the user.

The context of the search can include, but is not limited to, the search query, a user identifier of a searcher, contents of the search results, a search history for the user, advertisements used without search context elements, and a time of day of the search. Activities related to the context of the search can add a variety of gaming or competitive elements that address different audiences.

Figure 1:
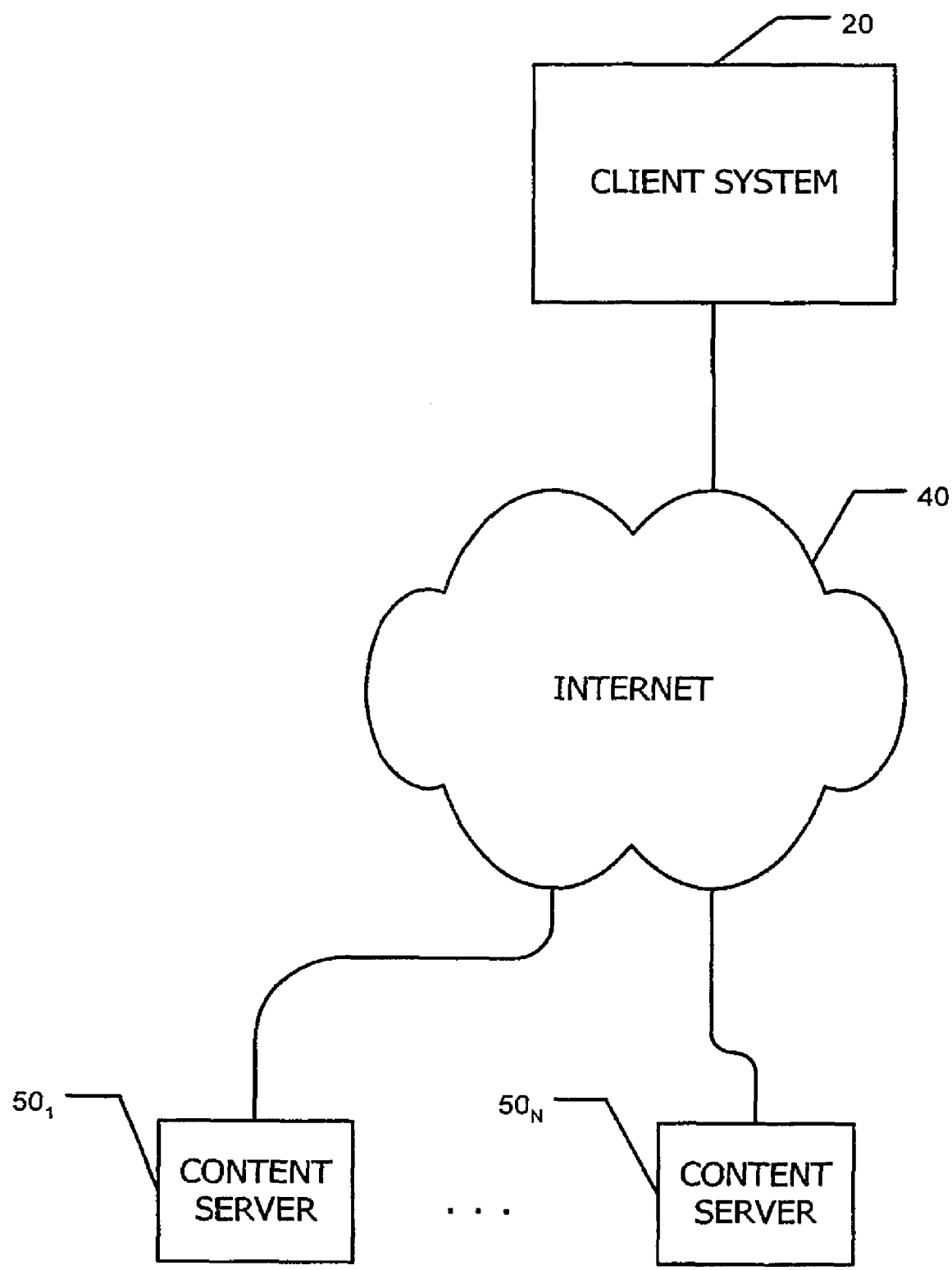
FIG. 1 is a block diagram of an information retrieval and communication network according to one embodiment of the present invention.

FIG. 1 is a block diagram of an information retrieval and communication network according to one embodiment of the present invention. This example illustrates a general overview of an information retrieval and communication network 10 including a client system 20. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any Wireless Access Protocol (WAP) enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems 501 to 50N over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems 501 to 50N or other servers. The present invention is suitable for use with the Internet, which refers to a specific global inter-network of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems 501 to 50N to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

Figure 2:
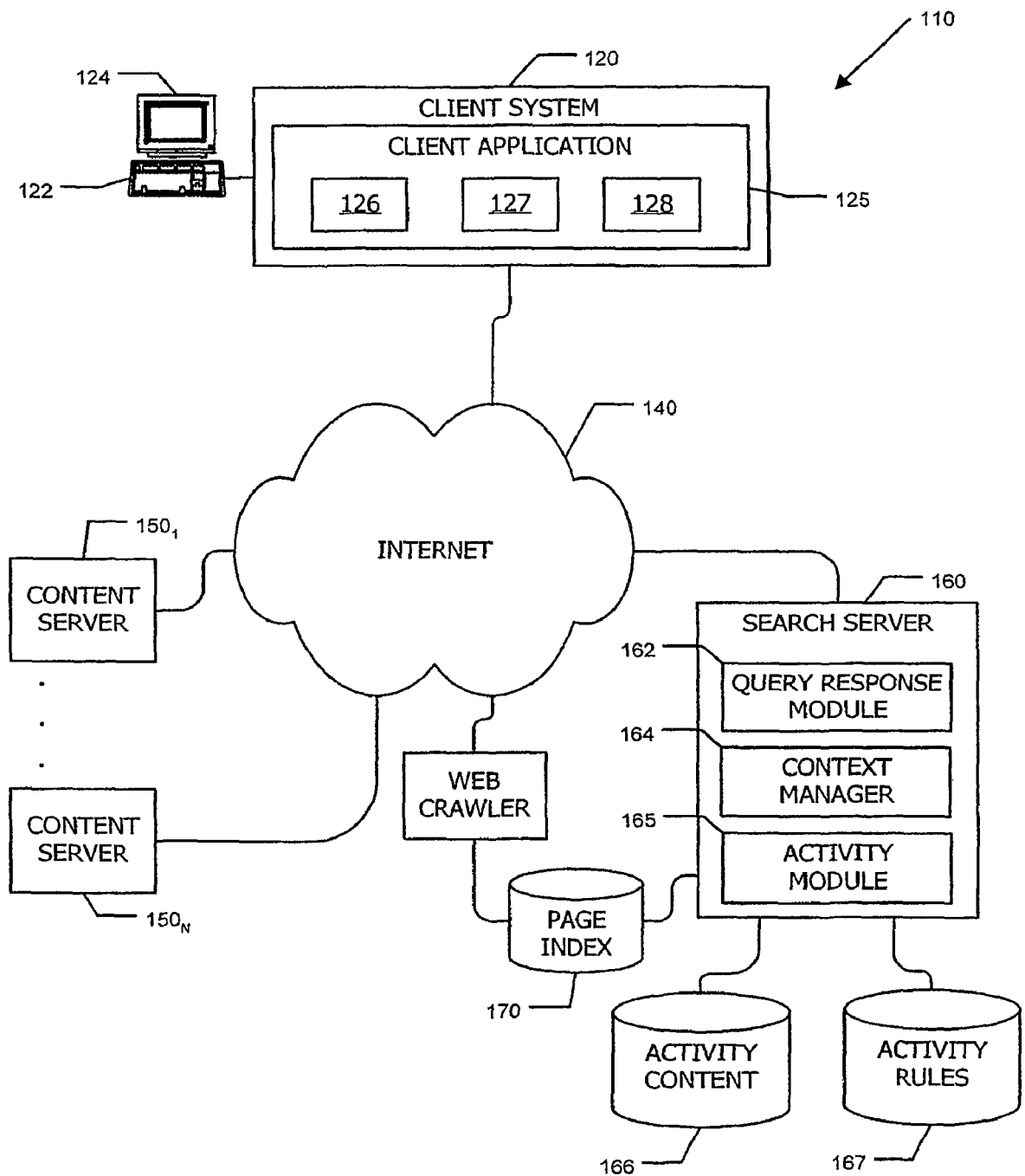
FIG. 2 is a block diagram of an information retrieval and communication network according to another embodiment of the present invention.

FIG. 2 is a block diagram of an information retrieval and communication network according to another embodiment of the present invention. This example illustrates another information retrieval and communication network 110 for communicating media content. As shown, network 110 includes client system 120, one or more content server systems 150, and a search server system 160. In network 110, client system 120 is communicably coupled through Internet 140 or other communication network to server systems 150 and 160. As described above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as described above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of applications executing on client system 120 with which application interface module 128 is preferably configured to interface according to aspects of the present invention include various e-mail applications, instant messaging (IM) applications, browser applications, document management applications and others. Further, user interface module 127 may include a browser, such as a default browser configured on client system 120 or a different browser.

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content.

Query response module 162 in one embodiment references various page indexes 170 that are populated with, e.g., pages, links to pages, data representing the content of indexed pages, etc. Page indexes may be generated by various collection technologies including an automatic web crawler 172, and/or various spiders, etc., as well as manual or semi-automatic classification algorithms and interfaces for classifying and ranking web pages within a hierarchical structure. These technologies may be implemented in search server system 160 or in a separate system (e.g., web crawler 172) that generates a page index 170 and makes it available to search server system 160. Various page index implementations and formats are known in the art and may be used for page index 170.

Query response module 162 is configured to provide data responsive to various search requests (queries) received from a client system 120, in particular from search module 126. As used herein, the term "query" encompasses any request from a user (e.g., via client 120) to search server 160 that can be satisfied by searching the Web (or other corpus) indexed by page index 170. In one embodiment, a user is presented with a search interface via search module 126. The interface may include a text box into which a user may enter a query (e.g., by typing), check boxes and/or radio buttons for selecting from predefined queries, a directory or other structure enabling the user to limit search to a predefined subset of the full search corpus (e.g., to certain web sites or a categorical subsection within page index 170), etc. Any search interface may be used.

Query response module 162 is advantageously configured with search related algorithms for processing and ranking web pages relative to a given query (e.g., based on a combination of logical relevance, as measured by patterns of occurrence of search terms extracted from the query; context identifiers associated with search terms and/or particular pages or sites; page sponsorship; connectivity data collected from multiple pages, etc.). For example, query response module 162 may parse a received query to extract one or more search terms, then access page index 170 using the search terms, thereby generating a list of "hits", i.e., pages or sites (or references to pages or sites) that are determined to have at least some relevance to the query. Query response module 162 may then rank the hits using one or more ranking algorithms. Particular algorithms for identifying and ranking hits are not critical to the present invention, and conventional algorithms may be used.

Search server system 160 is communicably coupled to a personalization database 166 that stores data pertaining to specific users of search server system 160 and to a page index 170 that provides an index to the corpus to be searched (in some instances, the World Wide Web). Personalization database 166 and page index 170 may be implemented using generally conventional database technologies.

According to one embodiment of the present invention, search server system 160 can also include context manager 164 and activity module 165. While activity module 165 is shown in this example as being part of the search server system 160, it should be understood that, in some cases, activity module 165 may be separate from search server system 160 and implemented as a standalone system or as part of another system. Regardless of the exact implementation, context manager 164 and activity module 165 provide for actively engaging a user of search server system 160. Generally speaking, search server system 160 can receive from the user of client system 120 a search query for a search. As discussed above, search server system 160 provides the user with search results for the search. Additionally, activity module can prompt the user to participate in a search-related activity. The search server system 160, via activity module 165 can accept user input for performing the search-related activity and provide an activity response to the user.

As will be discussed in detail below with reference to FIGS. 5-12, the search related activities provided by activity module 165 can include a number of games, competitions, and challenges and other interactive activities. Content and rules for providing these activities can be stored in one or more databases or information stores such as activity content database 166 and activity rules database 167 integral with or separate from search server system 160. These databases 166 and 167 are readable by activity module 165 and contain data such as text and graphics to be sent to the user participating in the activity, rules to be to be followed by the activity module such as when, how, to which users, etc. to make available a given activity, and may also include advertisements or other information provided by a third party to be sent to the user participating in an activity.

According to one embodiment, at least one aspect of the search-related activity is related to a context of the search as determined by context manager 164. Context manager 164 can be adapted to determine the context of the search based on the text, metadata, or other information related to the search request or response. The context of the search can include, but is not limited to, the search query, a user identifier of a searcher, contents of the search results, a search history for the user, advertisements used without search context elements, and a time of day of the search. Activities related to the context of the search can add a variety of gaming or competitive elements that address different audiences.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably. In addition, the query response module and activity module described herein may be implemented on the same server or on different servers.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of various page information). In addition, while the search server system is described as including a particular combination of component modules, it is to be understood that a division into modules is purely for convenience of description; more, fewer, or different modules might be defined.

Figure 3:
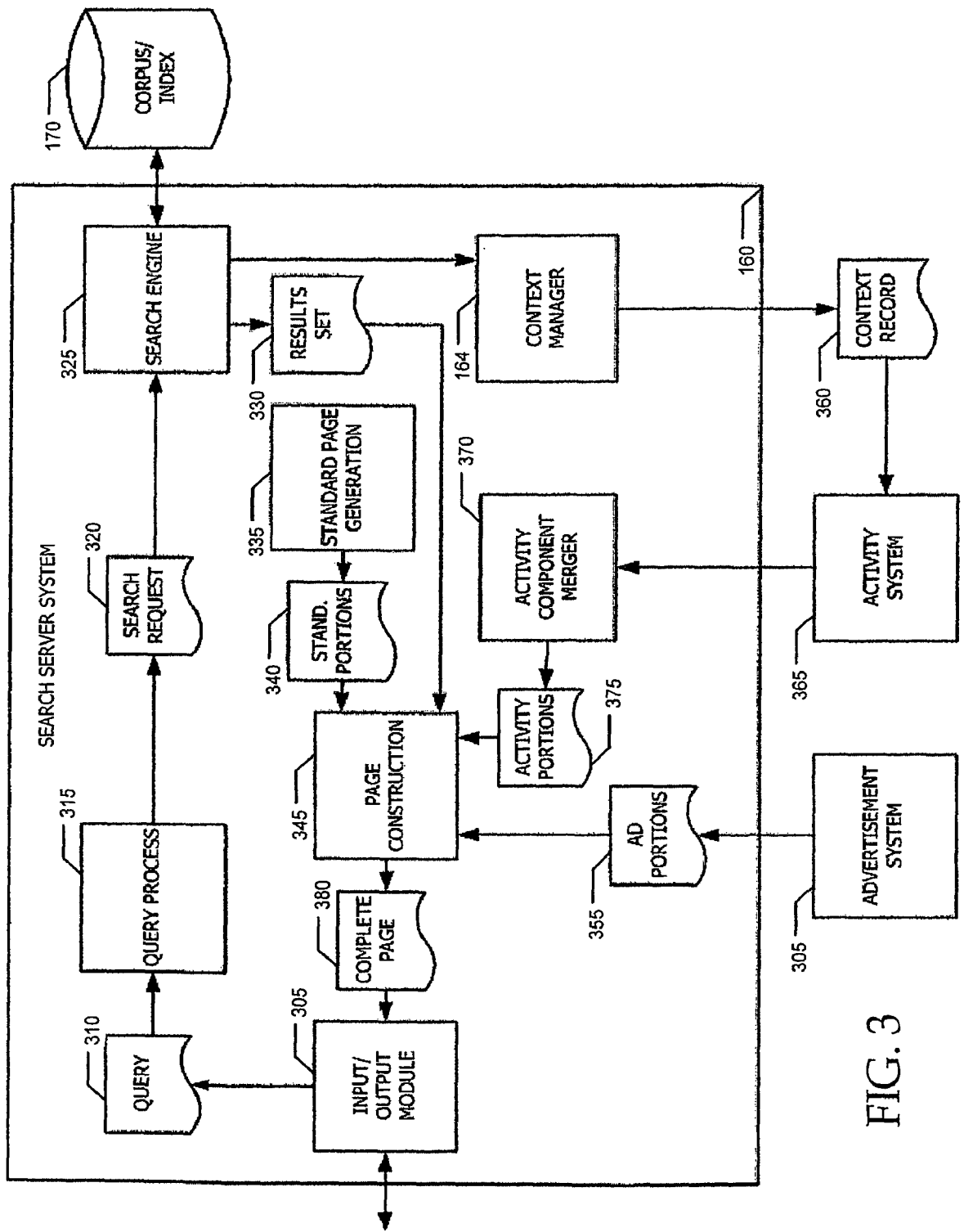
FIG. 3 is a block diagram illustrating major functional components of a search server and activity system according to one embodiment of the present invention.

FIG. 3 is a block diagram illustrating major functional components of a search server and activity system according to one embodiment of the present invention. This example includes search server system 160 as discussed above and illustrates in more detail major functional components of the system. It should be understood that the components shown and discussed here are offered for illustrative purposes only and actual implementations of a search server system can vary without departing from the scope of the present invention.

A user submitted query can be received by search server system 160 via input/output module 305 which is connected with the user via the Internet or other communications medium. Upon receiving a query from the user, input output module 305 passes the query 310 to query process 315 which in turn parses the query string and reformats it into a search request 320 to search engine 325. Search engine 325 then performs a search of the corpus of information or index 170 as described above.

Upon completion of the search of the corpus 170, search engine 325 sends a results set 330 to page construction module 345 which uses the results set 330 along with other information to generate a complete response page 380 for return to the user via input/output module 305. Page construction module also receives standard page portions 340 from standard page generation module 335. The standard page portion 340 generated by standard page generation module 335 can be a partially formed HTML or other format page representing the common portions and formatting of results listings. For example, standard page portion 340 can include the search service provider's banner or other identifying information as well as formatted placeholders into which the results set 330 will be placed by page construction module 345 to form a properly formatted results page.

According to one embodiment of the present invention, page construction module 345 can also receive from activity component merger module an activity portion 375 for inclusion in the complete response page 380. As introduced above, the activity system 365 can prompt the user, via elements added to the results page, to participate in a search-related activity. For example, activity system 365 can, via activity component merger module 370, cause a number of links, buttons, icons, or other indications to be added to the results page, each indication representing an available search-related activity. The search server system 160, together with activity system 365 provide a number of activities contextually related to the search.

As will be discussed in detail below with reference to FIGS. 5-12, the search related activities provided by activity system 365 can include a number of games, competitions, and challenges and other interactive activities. According to one embodiment, at least one aspect of the search-related activity is related to a context of the search as determined by context manager 164 based on information received from search engine 325. Context manager 164 can be adapted to determine the context of the search based on the text, metadata, or other information related to the search request or response. The context of the search can include, but is not limited to, the search query, a user identifier of a searcher, contents of the search results, a search history for the user, advertisements used without search context elements, and a time of day of the search. Activities related to the context of the search can add a variety of gaming or competitive elements that address different audiences.

Additionally, page construction module 345 can receive advertising portions 355 from advertisement system 350. Advertisement system 350 can represent systems of one or more entities paying for advertising on the results page returned to the user by search server system 160. Advertising portion 355 represents the HTML to be added to the standard portions 340 of the results page such as graphics, text, and links to the advertiser's website. As will be discussed below, the advertising portions may be related to the activities provided by activity system 365. That is, the advertisers may sponsor one or more of the activities provided by the activity system 365 and in return receive placement of advertising on the completed response page 380 returned to the user.

Therefore, completed response page 380 includes standard portions 340, results sets 330, activity portions 340 and advertising portions 355. As discussed, activity portions 340 represent a number of activities contextually related to the search and available to the user to actively engage the user in the search process. Processes that can be performed by search server system 160, activity system 365 and other components to provide these activities will now be discussed in detail.

Figure 4:
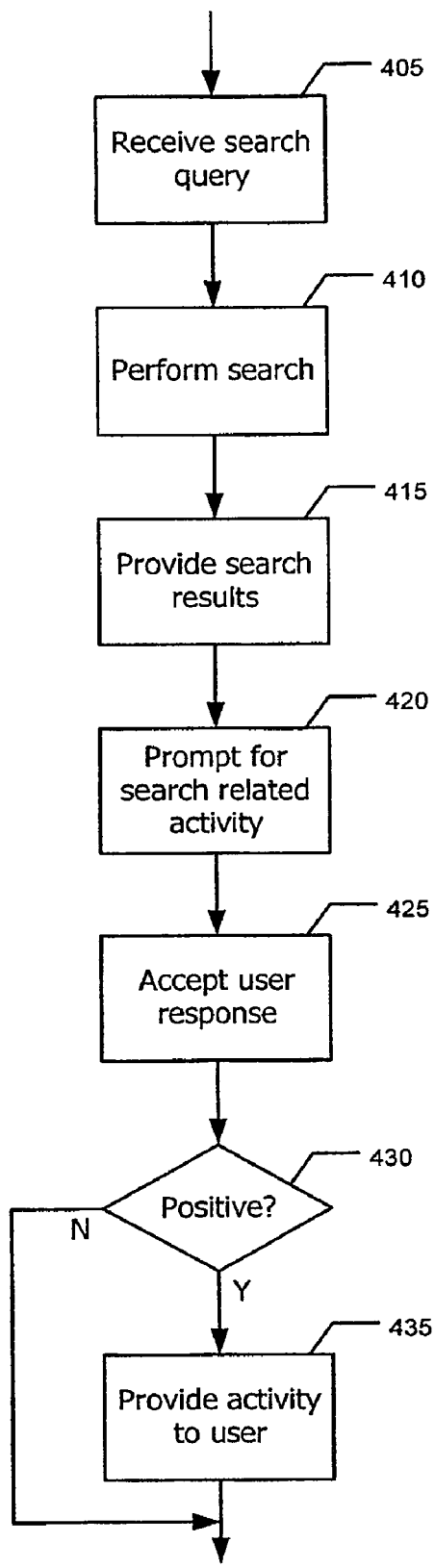
FIG. 4 is a flowchart illustrating a process for actively engaging a user of a search system according to one embodiment of the present invention.

FIG. 4 is a flowchart illustrating a process for actively engaging a user of a search system according to one embodiment of the present invention. According to this embodiment, the search server system receives 405 from the user a search query for a search of a corpus of information. The search server system performs 410 the search and provides 415 the user with search results for the search. That is, as described above, in response to the users request for a search, the search server performs a search and returns a list of links to pages or sites that are determined to have at least some relevance to the query.

As part of the page presenting the list of links to relevant information, the search server system can prompt 420 the user to participate in a search-related activity. That is, the results page can include one or more buttons, links, or other graphical or textual indications of the availability of one or more activities that are related to the search, i.e., have at least one aspect dependent on a context of the search. For example, the results page can include a number of buttons in a top or side frame or along a top edge of the results page, each button representing a different available activity related to the results or other aspect of the search.

The context of the search can include, but is not limited to, one or more of the search query, a user identifier of a searcher, contents of the search results, a search history for the user, advertisements used without search context elements, and a time of day of the search. For example, as will be discussed in detail below, the search-related activity may be a game or competition that involves correctly answering a riddle or question or series of riddles or questions. In some cases, the topic or subject matter of the riddles or questions may be related to keywords used by the user in the search query or the contents of the results returned by the search service provider.

After prompting 420 the user to participate in a search-related activity, the search service system can accept 425 user input for performing the search-related activity. That is, the search service system can detect a user selection of the indication of availability of the search-related activity. For example, a mouse click on a button or link indicating an activity can be detected. In response to a positive 430 selection of the indication, the search service provider system can provide an activity response to the user such as directing the user to a page for conducting the activity, opening a pop-up window providing information related to the activity, etc.

According to one embodiment of the present invention, the search-related activity may be sponsored by a commercial or other entity and can include advertising for that entity. Using the example introduced above, the search-related activity may be a game or competition that involves correctly answering a riddle or question or series of riddles or questions. As will be discussed below, a prize or reward may be provided to users answering questions correctly or winning a competition. Such prizes or rewards may be provided by one or more sponsors who, in return receives advertising from the search service provider in the form of a banner, pop-up window, etc. indicating "This prize provided by . . ." or other similar messages.

While this discussion introduces many different types of activities, other activities are equally useful with embodiments of the present invention. Generally speaking any type of game, competition, challenge, or other activity for which one or more aspects of that activity can be made to relate to the search context is considered to be equally amenable to use with embodiments of the present invention. Some exemplary types of search-related activities are now discussed with reference to FIGS. 5-12.

According to one embodiment, the search-related activity can comprise an instant win game. Generally speaking, the instant win game awards a prize or reward to various users of the search service system on a chance basis. The chance basis may be, for example, selection of a user at random, selection of every X number of user's (e.g., every 1,000,000 queries), selection of a user at a particular time (e.g., every ½ hour), etc.

Figure 5:
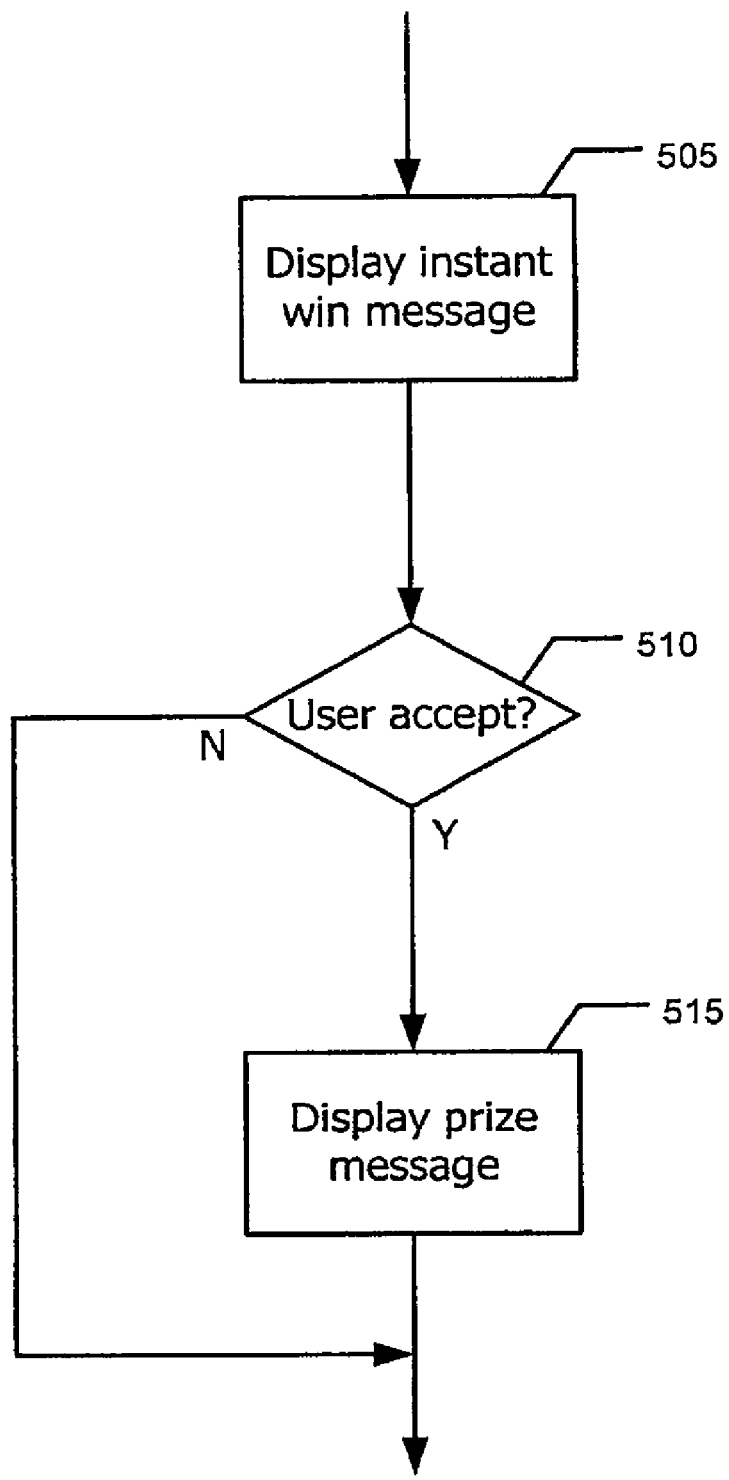
FIG. 5 is a flowchart illustrating a process for actively engaging a user of a search system using an instant win game according to one embodiment of the present invention.

FIG. 5 is a flowchart illustrating a process for actively engaging a user of a search system using instant prizes according to one embodiment of the present invention. In this example, the search service system, displays 505 as part of a display for the search results an indication to the user to inform the user of availability of a reward. For example, a treasure box or other icon or graphic may be displayed on the page displaying user's search results. The user can then click or otherwise select the indication to accept the prize. If 510 the user accepts the prize a message can be displayed to the user indicating the nature of the reward. For example, a pop-up window, overlay, or other mechanism can be used to indicate to the user that "You have won US $5" or other message.

According to one embodiment of the present invention, the nature of the prize can be dependent on the context of the search. That is, a particular prize can be award based on a searches for particular keywords. For example, a music CD featuring a particular band can be given as a prize to every 1,000 users searching for the band's name or sporting event tickets can be given to every X number of user's searching for the team's name.

Additionally, the display of the prize information can include an advertisement for one or more sponsors for the prize. For example, the display may indicate "You have won US $5" with by a banner, graphic, text, etc. indicating one or more entities providing the prize and/or paying for the advertisement. The search service provider may have a number of different pricing arrangements with the sponsors. For example, the advertisement may be a "clickable" link to the sponsor's website. In this case, the search service provider may pay for the prize and then charge the sponsor if the user clicks the ad to visit the sponsor's site. Alternatively, the sponsor may pay for the ad by providing the prize and/or paying a fee for the ad.

According to another embodiment, the search-related activity can comprise a riddle game. In this activity, the user can select an icon or other indication on the search results page to receive a riddle or question that can be related to the context of the search. If the user correctly answers the riddle or question, a prize can be awarded.

Figure 6:
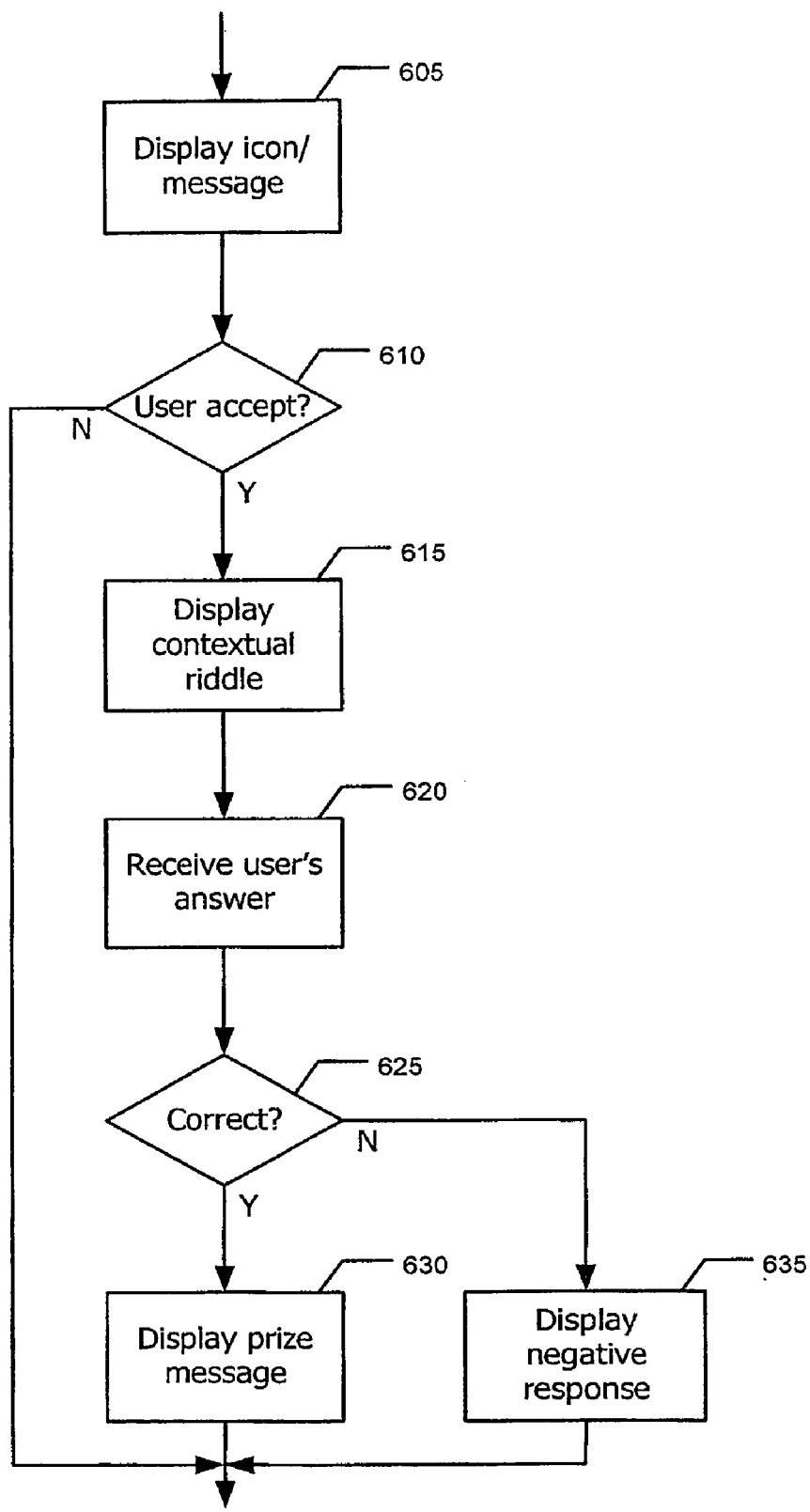
FIG. 6 is a flowchart illustrating a process for actively engaging a user of a search system using a riddle game according to one embodiment of the present invention.

FIG. 6 is a flowchart illustrating a process for actively engaging a user of a search system using a riddle game according to one embodiment of the present invention. In this example, the search service system, displays 605 an indication to the user as part of a display for the search results to inform the user of availability of a riddle or question. For example, a link, button, icon, or other graphic may be displayed on the page displaying the user's search results. The user can then click or otherwise select the indication to participate. If 610 the user accepts the riddle, the riddle or question can be displayed 615. For example, a pop-up, overlay, new web page, etc. may be displayed to the user that includes the riddle or question and a text box or other device through which the user can enter an answer. The message can include one or more question, instructions on how to participate, hints, etc.

The search service system accepts 620 the answer from the user and checks 625 whether the answer is correct. If 625 the answer is correct, a message can be displayed 630 to the user indicating a reward or prize. As above, the display of the prize information can include an advertisement for one or more sponsors for the prize. The sponsors may supply the prize, pay for the advertisement, and/or have another fee arrangement with the search service provider. If 625 the answer is incorrect, a message can be displayed 635 to the user indicating that his answer is not correct.

According to another embodiment, the search-related activity can comprise a search query competition. In this activity, the user can select an icon or other indication on the search results page to receive a description of the competition and information on how to compete. The competition can be to find a particularly hard-to-find piece of information somewhere on the Internet. According to one embodiment, the hard-to-find information may be related to the context of the user's search. If the user is the first to submit a search query that correctly locates the hard-to-find information, a prize can be awarded.

Figure 7:
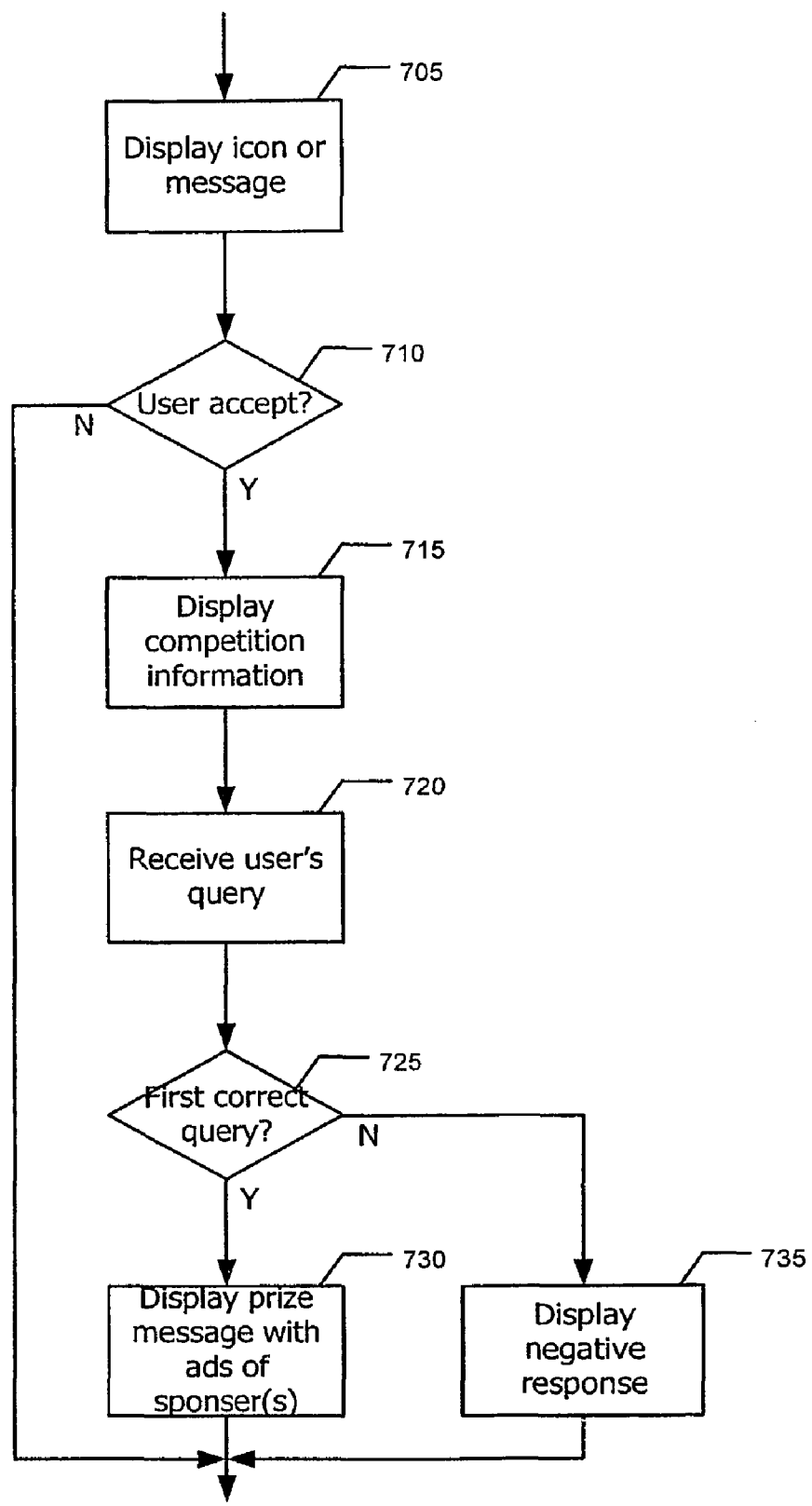
FIG. 7 is a flowchart illustrating a process for actively engaging a user of a search system using a search query competition according to one embodiment of the present invention.

FIG. 7 is a flowchart illustrating a process for actively engaging a user of a search system using a search query competition according to one embodiment of the present invention. In this example, the search service system, displays 705 an indication to the user as part of a display for the search results to inform the user of availability of a search query competition. For example, a link, button, icon, or other graphic may be displayed on the page displaying the user's search results. The user can then click or otherwise select the indication to participate. If 710 the user accepts, information about the competition can be displayed 715. For example, a pop-up, overlay, new web page, etc. may be displayed to the user that includes instructions, rules, a description of the hard-to-find information, etc. and a text box or other device through which the user can enter an answer.

The search service system can accept 720 a search query from the user and check 725 whether the search query is the first submitted to correctly locate the hard-to-find information. If 725 the search query is the first correct query, a message can be displayed 730 to the user indicating a reward or prize. As above, the display of the prize information can include an advertisement for one or more sponsors for the prize. The sponsors may supply the prize, pay for the advertisement, and/or have another fee arrangement with the search service provider. According to one embodiment, the advertiser can pay a fee to the search service provider to locate the hard-to-find information on the sponsor's web page. If 725 the query is incorrect or is not the first correct query, a message can be displayed 735 to the user indicating that he has not won.

According to another embodiment, the search-related activity can comprise a link location game. In this activity, the user can select an icon or other indication on the search results page to receive a description of the game. The game can be to find a specially marked piece text somewhere on the Internet. According to one embodiment, the specially marked text or its location may be related to the context of the user's search. If the user submits a search query containing the specially marked text, a prize can be awarded.

Figure 8:
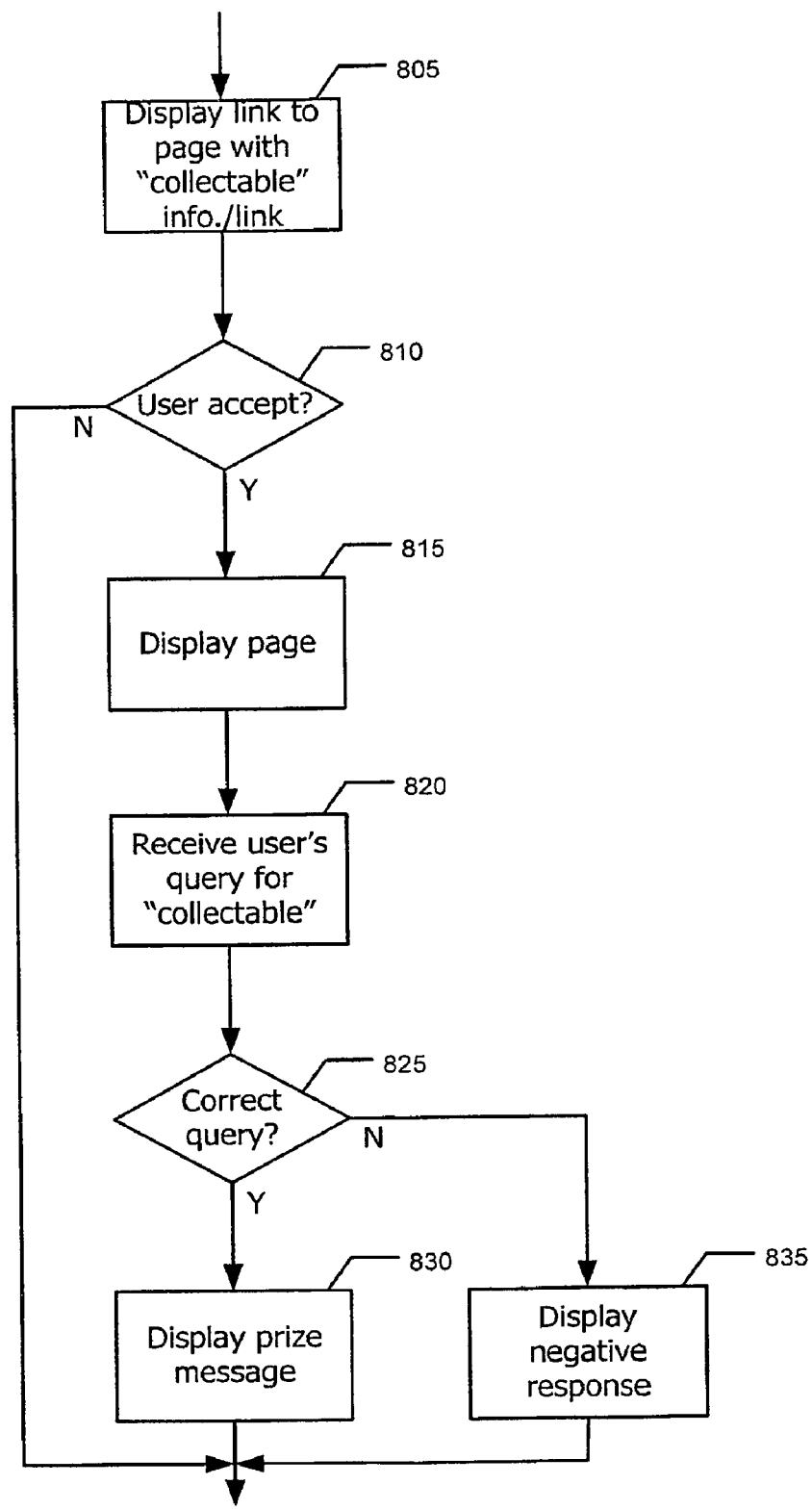
FIG. 8 is a flowchart illustrating a process for actively engaging a user of a search system using a link location game according to one embodiment of the present invention.

FIG. 8 is a flowchart illustrating a process for actively engaging a user of a search system using a link location game according to one embodiment of the present invention. In this example, the search service system, displays 805 an indication to the user as part of a display for the search results to inform the user of availability of the link location game. For example, a link, button, icon, or other graphic may be displayed on the page displaying the user's search results. The user can then click or otherwise select the indication to participate. If 810 the user accepts, a page containing the specially marked text can be displayed 815.

The search service system can accept 820 a search query from the user and check 825 whether the search query contains the specially marked text. If 825 the search query contains the specially marked text, a message can be displayed 830 to the user indicating a reward or prize. As above, the display of the prize information can include an advertisement for one or more sponsors for the prize. The sponsors may supply the prize, pay for the advertisement, and/or have another fee arrangement with the search service provider. According to one embodiment, the advertiser can pay a fee to the search service provider to locate the specially marked text on the sponsor's web page. If 825 the query is incorrect or does not contain the specially marked text, a message can be displayed 835 to the user indicating that he has not won.

According to another embodiment, the search-related activity can comprise a guessing game. In this activity, the user can select an icon or other indication on the search results page to receive a description of the game. The game can be to guess a predetermined search query. According to one embodiment, the predetermined search query may be related to the context of the user's search. If the user submits a search query matching the predetermined search query, a prize can be awarded.

Figure 9:
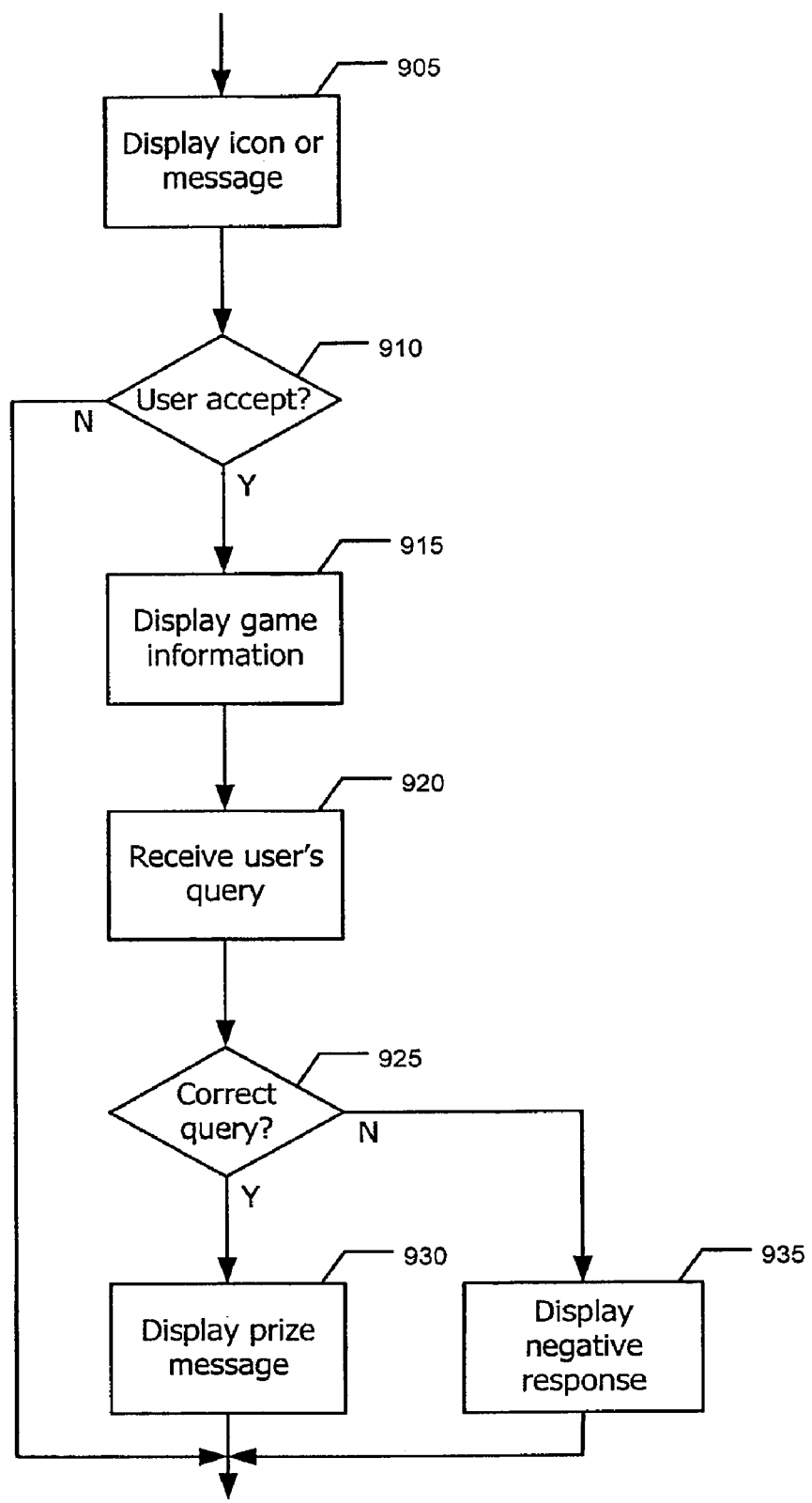
FIG. 9 is a flowchart illustrating a process for actively engaging a user of a search system using a guessing game according to one embodiment of the present invention.

FIG. 9 is a flowchart illustrating a process for actively engaging a user of a search system using a guessing game according to one embodiment of the present invention. In this example, the search service system, displays 905 an indication to the user as part of a display for the search results to inform the user of availability of the guessing game. For example, a link, button, icon, or other graphic may be displayed on the page displaying the user's search results. The user can then click or otherwise select the indication to participate. If 910 the user accepts, information about the game can be displayed 915. For example, a pop-up, overlay, new web page, etc. may be displayed to the user that includes instructions, rules, hints, etc. and a text box or other device through which the user can enter an answer.

The search service system can accept 920 a search query from the user and check 925 whether the search query matches the predetermined search query. If 925 the search query matches the predetermined search query, a message can be displayed 930 to the user indicating a reward or prize. As above, the display of the prize information can include an advertisement for one or more sponsors for the prize. The sponsors may supply the prize, pay for the advertisement, and/or have another fee arrangement with the search service provider. If 925 the query does not match the predetermined search query, a message can be displayed 935 to the user indicating that he has not won.

According to another embodiment, the search-related activity can comprise a link collection competition. In this activity, the user can select an icon or other indication on the search results page to receive a description of the competition and information on how to compete. The competition can be based on judging user submitted lists of links to pages or other content related to a particular topic. According to one embodiment, the topic may be related to the context of the user's search. The user or users judged to have the top lists can be awarded a prize.

Figure 10:
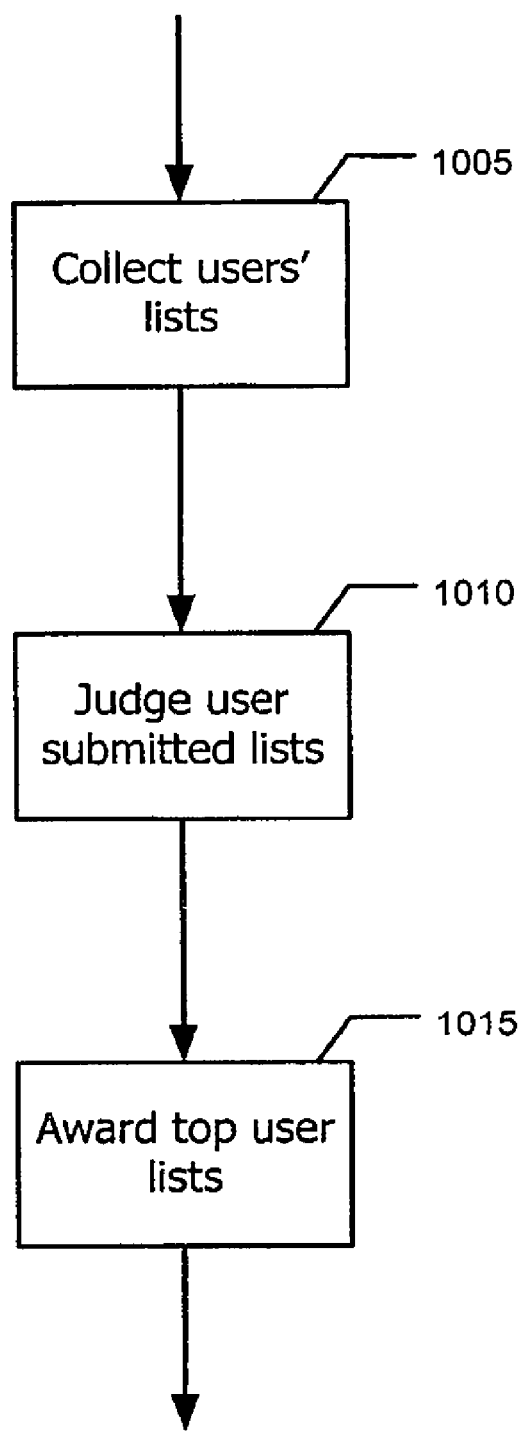
FIG. 10 is a flowchart illustrating a process for actively engaging a user of a search system using a link collection competition according to one embodiment of the present invention.

FIG. 10 is a flowchart illustrating a process for actively engaging a user of a search system using a link collection competition according to one embodiment of the present invention. In this example, the competition includes collecting 1005 a list of links from the user. That is, the user can, through a page provided by the search service provider submit his bookmarks or other list of links to pages or content related to the topic of the competition. The submitted lists can be judged 1010 by the search service provider or by popular vote of users of the search service system based on any number of criteria. A reward can be awarded 1015 to the user or users based on the judging.

According to another embodiment, the search-related activity can comprise a chain-type riddle game. In this activity, the user can select an icon or other indication on the search results page to receive a riddle or question that can be related to the context of the search. If the user correctly answers the riddle or question, another riddle or question can be presented wherein the answer to the first riddle or question represents a hint to the answer for the second riddle or question. After successfully answering some number of riddles in the chain, a prize may be awarded to the user.

Figure 11:
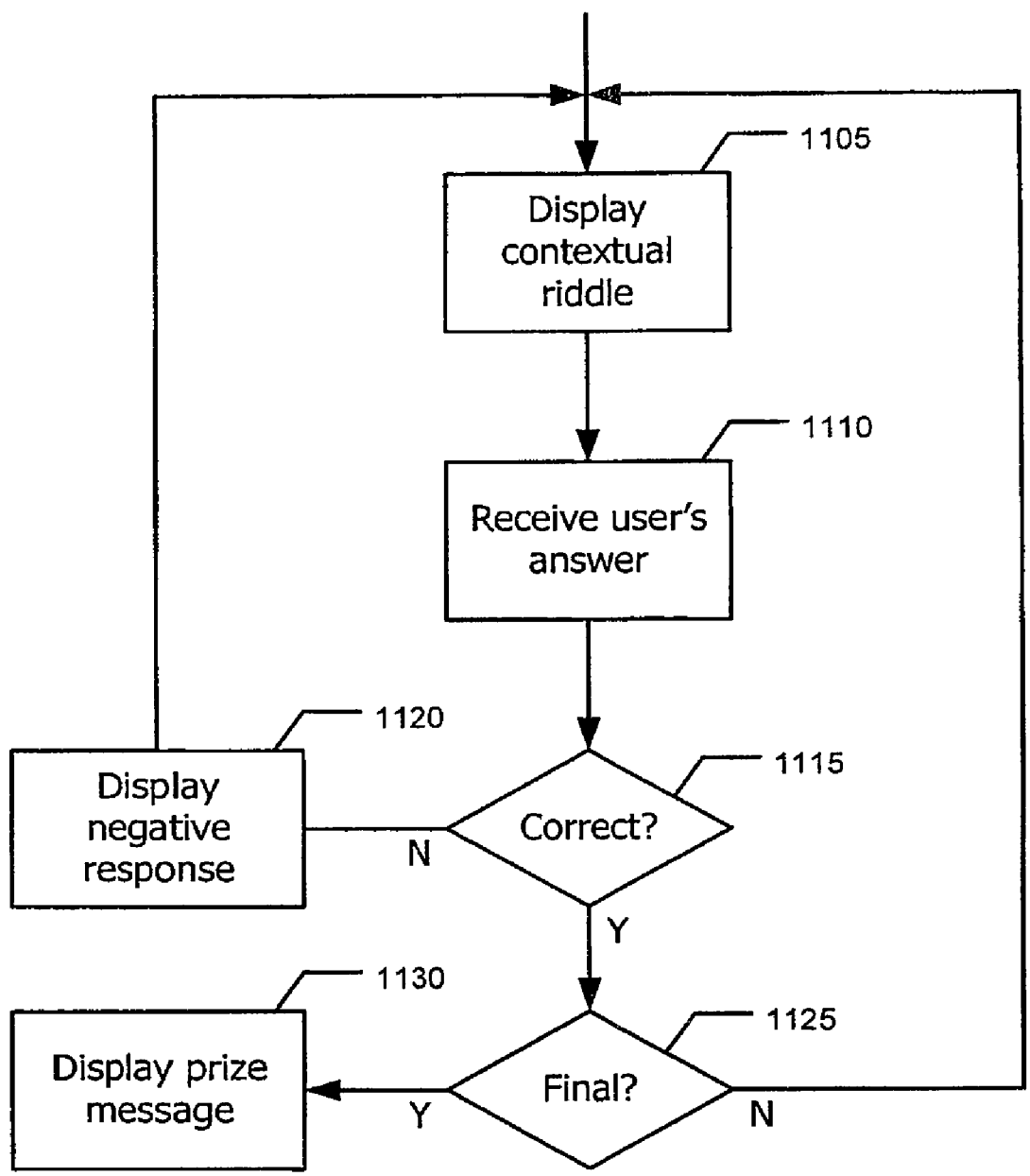
FIG. 11 is a flowchart illustrating a process for actively engaging a user of a search system using a chain-type riddle game according to one embodiment of the present invention.

FIG. 11 is a flowchart illustrating a process for actively engaging a user of a search system using a chain-type riddle game according to one embodiment of the present invention. In this example, a first question can be displayed 1105 to the user. According to one embodiment, the nature or topic of the question can be contextually related to the user's original query. The search service system accepts 1110 the first answer from the user and checks 1115 whether the answer is correct. If 1115 the answer is correct, a second question can be displayed to the user, wherein an answer to the second question requires knowledge of the first answer. That is, the riddles or questions are chained in the sense the answers to successive questions require correct knowledge of the previous answers. This process continues until 1126 a final answer is reached. With the final answer being correct, a message can be displayed 930 to the user indicating a reward or prize. If 1115 an answer is not correct, a negative response can be displayed 1120 and the user allowed to try again.

According to another embodiment, the search-related activity can comprise an elimination-type riddle competition. In this activity, the user can select an icon or other indication on the search results page to enter the competition. The competition can involve a number of users receiving a riddle or question that can be related to some common area of interest. If the user correctly answers the riddle or question, he can continue on to successively more difficult questions. However, if the user answers incorrectly, he is eliminated from the competition. The final user or small group of users may be awarded a prize.

Figure 12:
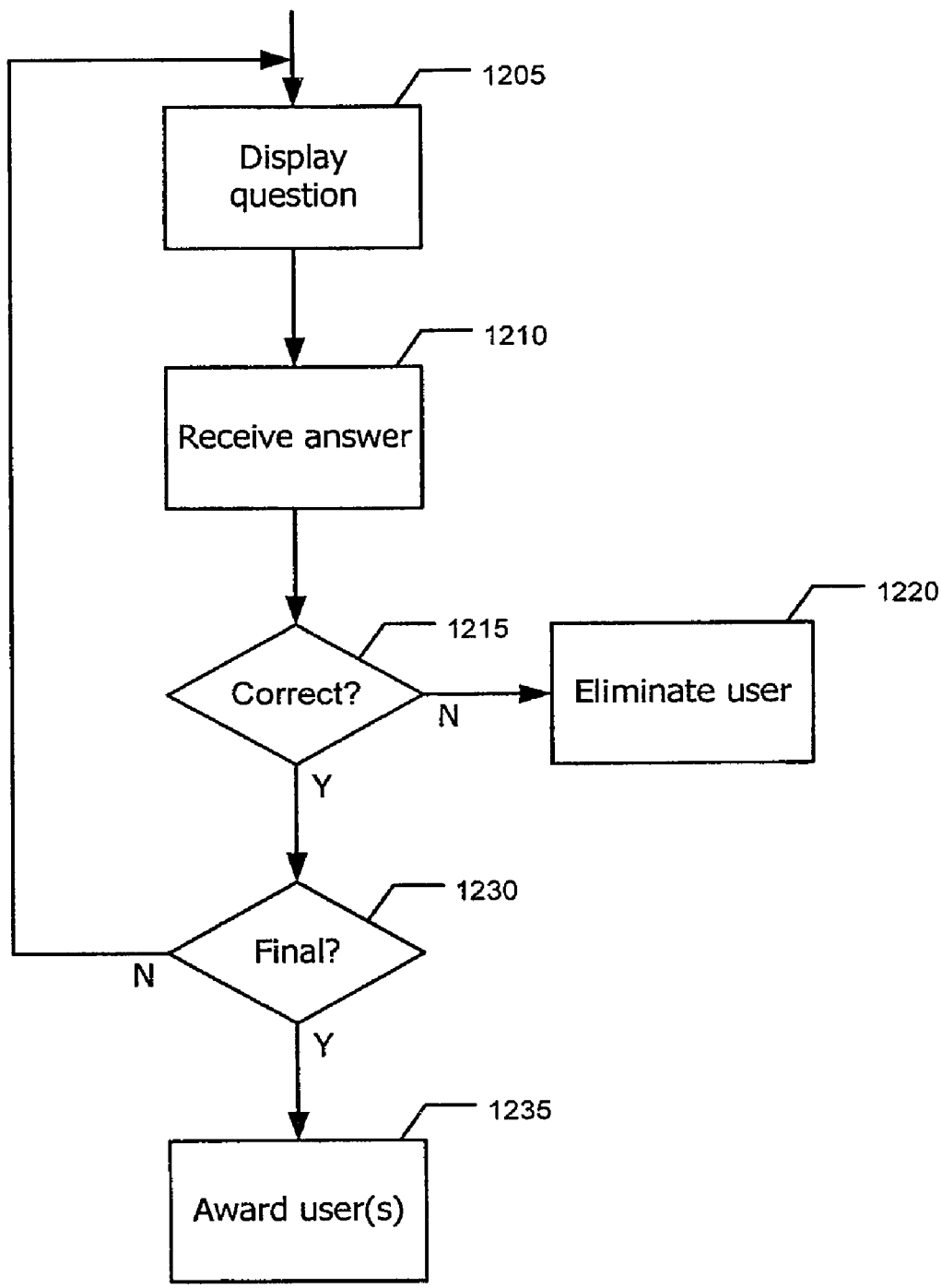
FIG. 12 is a flowchart illustrating a process for actively engaging a user of a search system using an elimination-type riddle competition according to one embodiment of the present invention.

FIG. 12 is a flowchart illustrating a process for actively engaging a user of a search system using an elimination-type riddle competition according to one embodiment of the present invention. In this example, the competition begins with displaying 1205 a first question to the user and accepting 1210 a first answer from the user. If 1215 the first answer is incorrect, the user is eliminated 1220 from further competition. However, if 1215 the answer is correct, the user advances to a second question. This process continues until 1230 the final round which may be some predetermined number of questions or may be when only one or some small number of users remain at which point the remaining user(s) can be awarded 1235 a prize.

The embodiments described herein may make reference to Web sites, URLs, links, and other terminology specific to instances where the World Wide Web (or a subset thereof) serves as the search corpus. It should be understood, however, that the systems and methods described herein can be adapted for use with a different search corpus (such as an electronics database or document repository).

Computer programs incorporating various features of the present invention may be encoded on various computer readable media for storage and/or transmission; suitable media include magnetic disk or tape, optical storage media such as CD or DVD, flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method of actively engaging a user of a search system while participating in an activity, the method comprising:
   in response to receiving one or more search queries from the user, performing the following for each search query of the one or more search queries:
      performing a search of a corpus of information and determining search results for the search; and
      displaying the search results for the search query;
   displaying a display of an activity, wherein the activity is generated by the search system and involves the user answering a plurality of questions that have topics that are contextually related to the search results of the one or more queries;
   wherein the search system selects, for the activity, the plurality of questions;
   (a) accepting user input that provides an answer to a question, from the plurality of questions, generated by the search system, for performing the activity, wherein at least one question, of the plurality of questions, is a question that has an answer within contents of the search results of at least one of the one or more search queries;
   (b) in response to receiving the answer to the question, updating the display of the activity; and
   (c) repeating steps (a) through (b) for each question of the plurality of questions;
   for at least one question of the plurality of questions, the step of updating the display of the activity comprises:
   determining whether the received answer is correct, and if so, displaying a first message to the user indicating a reward; otherwise, displaying a second message to the user indicating that the answer was incorrect;
      wherein the method is performed by one or more computing devices.

2. The method of claim 1, wherein the step of displaying the display of the activity is performed in response to a user selection of a link, a button, an icon, or other graphics presented with said activity.

3. A non-transitory computer-readable storage medium storing one or more sequences of instructions which, when executed by one or more processors, cause the one or more processors to perform the method recited in claim 2.

4. The method of claim 1,
   wherein the question, from the plurality of questions, is displayed in a pop-up display, an overlay display, or a new web page;
   wherein the display of the activity comprises activity-participation instructions;
   wherein the user input that provides the answer to the question is displayed in a text box.

5. A non-transitory computer-readable storage medium storing one or more sequences of instructions which, when executed by one or more processors, cause the one or more processors to perform the method recited in claim 4.

6. A non-transitory computer-readable storage medium storing one or more sequences of instructions which, when executed by one or more processors, cause the one or more processors to perform the method recited in claim 1.

7. A method of engaging a user of a search system while participating in an activity, the method comprising:
   displaying on a web page a display that includes:
   (a) an activity, generated by the search system, for finding a particular piece of information,
   (b) one or more controls for submitting search queries associated with the activity to a search engine; and
   (c) a description of the particular piece of information;
   in response to the user using one of the controls to submit a query to the search engine, the search engine generating search results for the query;
   the search system determining whether the particular piece of information is included in the search results;
   wherein success at the activity is based, at least in part, on whether the search results include the particular piece of information;
   generating, by the search system, an indication of whether the activity was a success based on whether the particular information is included in the search results;
   wherein the indication indicates a reward when the activity was a success;
   wherein the indication indicates that the submitted query was incorrect when the activity was not a success;
      wherein the method is performed by one or more computing devices.

8. The method of claim 7, wherein the display further comprises activity-participation instructions.

9. A non-transitory computer-readable storage medium storing one or more sequences of instructions which, when executed by one or more processors, cause the one or more processors to perform the method recited in claim 8.

10. The method of claim 7, wherein the reward provides a monetary discount for goods or services offered by one or more sponsors of the activity.

11. A non-transitory computer-readable storage medium storing one or more sequences of instructions which, when executed by one or more processors, cause the one or more processors to perform the method recited in claim 10.

12. A non-transitory computer-readable storage medium storing one or more sequences of instructions which, when executed by one or more processors, cause the one or more processors to perform the method recited in claim 7.

* * * * *